United States Patent [19]

Sato et al.

[11] Patent Number: 5,101,489
[45] Date of Patent: Mar. 31, 1992

[54] DATA PROCESSING UNIT INCLUDING A VARIABLE BIT LENGTH BYPASS CIRCUIT

[75] Inventors: Taizo Sato, Kawasaki; Kouji Kanamaru, Zama, both of Japan

[73] Assignee: Fujitsu Limited, Kawasaki, Japan

[21] Appl. No.: 318,639

[22] Filed: Mar. 3, 1989

[30] Foreign Application Priority Data

Mar. 8, 1988 [JP] Japan ................... 63-54362

[51] Int. Cl.⁵ .................... G06F 12/02; G06F 13/40
[52] U.S. Cl. ................................................ 395/425
[58] Field of Search ... 364/200 MS File, 900 MS File

[56] References Cited

U.S. PATENT DOCUMENTS

| | | | |
|---|---|---|---|
| 4,189,770 | 2/1980 | Gannon et al. | 364/200 |
| 4,219,874 | 8/1980 | Gusev et al. | 364/200 |
| 4,224,684 | 9/1980 | Conner et al. | 364/900 |
| 4,268,907 | 5/1981 | Porter et al. | 364/200 |
| 4,433,374 | 2/1984 | Hanson et al. | 364/200 |
| 4,590,556 | 5/1986 | Berger et al. | 364/200 |
| 4,635,194 | 1/1987 | Burger et al. | 364/200 |
| 4,716,527 | 12/1987 | Graciotti | 364/200 |
| 4,719,568 | 1/1988 | Carrubba et al. | 364/200 |
| 4,742,454 | 5/1988 | Robinson et al. | 364/200 |
| 4,851,993 | 7/1989 | Chen et al. | 364/200 |
| 4,937,738 | 6/1990 | Uchiyama et al. | 364/200 |
| 4,942,518 | 7/1990 | Weatherford et al. | 364/200 |

OTHER PUBLICATIONS

Daghir et al.; "Bypass Circuit for Receiver and Driver Delay Measurement"; IBM Technical Disclosure Bulletin, vol. 26, No. 9, Feb. 1984; pp. 4708-4709.

Primary Examiner—Thomas C. Lee
Assistant Examiner—Krisna Lim
Attorney, Agent, or Firm—Staas & Halsey

[57] ABSTRACT

In a data processing unit which includes first and second buses and an arithmetic and logic unit, there is provided a register file connected between the first and second buses, for storing data on the second bus. The register file includes a plurality of a register portion having a capacity equal to or exceeding a minimum data length of data processed in the ALU, and a bypass circuit connected between the first and second buses for bypassing data on the second bus to output the data to the first bus per unit of the minimum data length, the bypass circuit including a plurality of bypass lines each having the minimum data length. A control circuit controls data read from and writing to the register file per a unit of the minimum data length and controls the bypass circuit so as to bypass the data on the second bus to the first bus per a unit of the minimum data length.

14 Claims, 12 Drawing Sheets

DATA PROCESSING UNIT INCLUDING A VARIABLE BIT LENGTH BYPASS CIRCUIT

BACKGROUND OF THE INVENTION

The present invention generally relates to a data processing unit having a bypass circuit, and in particular to a data processing unit having a bypass circuit which can cope with a bypass control for various data having different data length (word length) with high flexibility.

Generally, data processing in a data processing unit such as a computer or a microprocessor is carried out with a register file. By using a register file, high-speed data processing can be done without being limited by the access speed of an external memory. However, a delay may occur in data processing even with the register file, because it takes time to renew or rewrite data in the register file.

Figure 1:
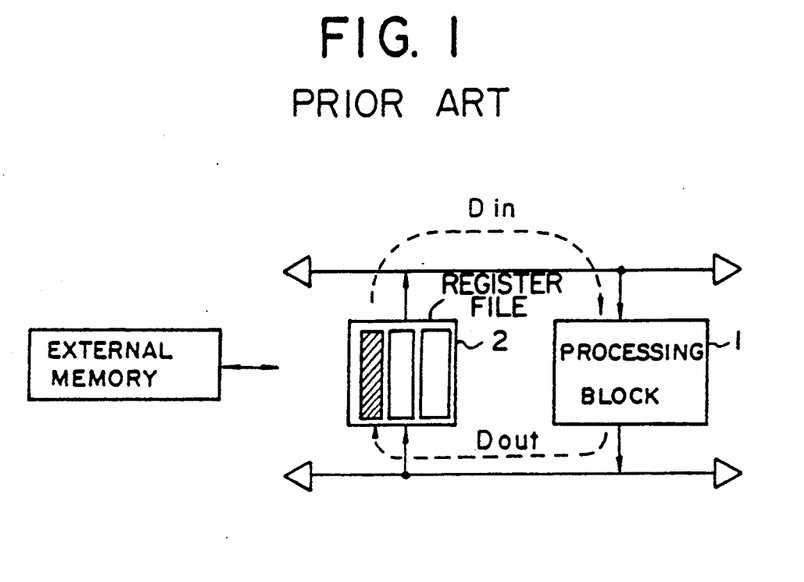
FIG. 1 is a block diagram of the conventional data processing unit having no bypass circuit.
Figure 2:
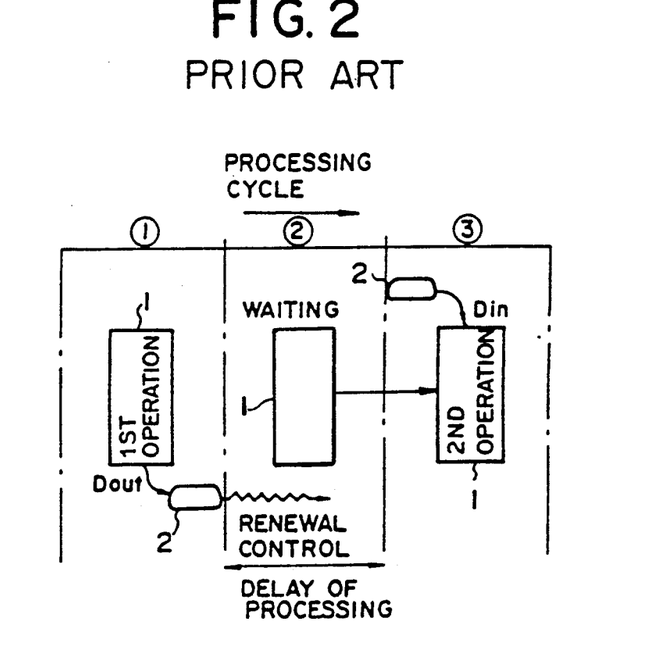
FIG. 2 is a view illustrating the flow of data in the data processing unit of FIG. 1.

Referring to FIGS. 1 and 2, a processing block 1 subjects input data Din to a predetermined data processing, and produces output data Dout in a processing cycle ①. The output data Dout is then written into a register file ②. Thereby, the content of the register file is renewed with the output data Dout during a processing cycle 2 shown in FIG. 2. Thereafter, when the next data processing step using the just written data (hatched block inside the Processing cycle 2) is required, necessary data, including the hatched data are read out from the register file 2 in a processing cycle ③, and the desired data processing is carried out. It can be seen from the above-mentioned description that the data processing which uses the data just written (renewed) cannot be performed immediately after the processing cycle ②, or in other words, must be kept waiting during the processing cycle ②. This causes a delay of data processing.

Figure 3:
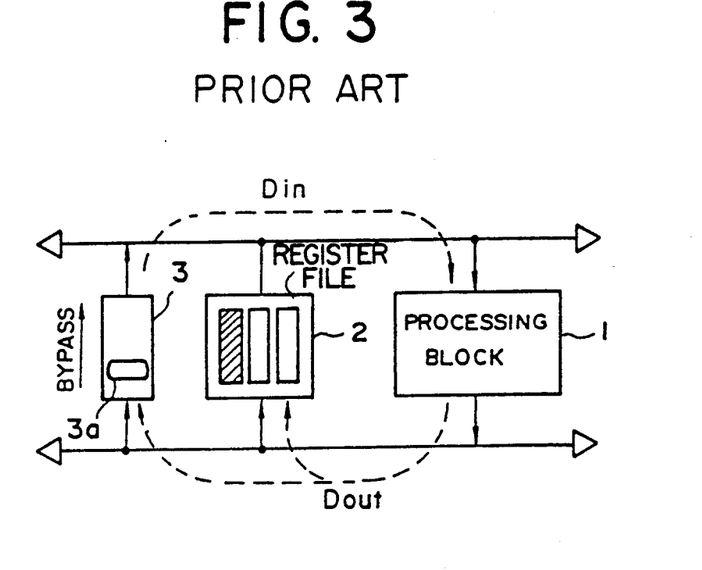
FIG. 3 is a block diagram of the conventional data processing unit having a bypass circuit.

In order to overcome the above-mentioned problem, a bypass control has been proposed. FIG. 3 shows the basic arrangement for a conventional bypass control. As shown, a bypass circuit 3, which is arranged between data buses, functions to pass the processed data Dout derived from the processing block 1 and supply the processing block 1 with the bypassed data Din as it is. When the register file 2 is renewed with the processed data Dout supplied from the processing block 1, which is to be used in the next data processing, the processed data Dout is passed through the bypass circuit 3 and is directly supplied, as the input data Din, to the processing block 1. Then, the processing block 1 carried out the next data processing by referring to the bypassed input data. In this manner, the bypass circuit 3 makes it possible to perform both the next data processing and renewal of the register file 2 at the same time.

Figure 4:
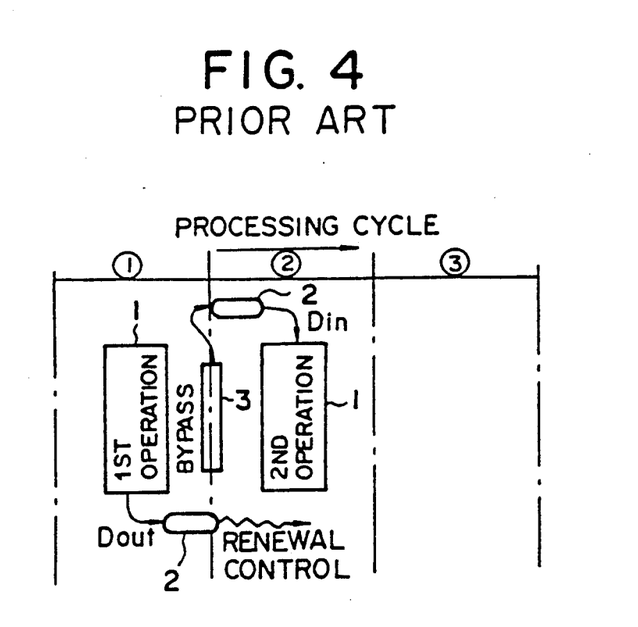
FIG. 4 is a view illustrating the flow of data in the data processing unit of FIG. 3.

FIG. 4 illustrates a procedure of the above-mentioned data processing. It can be seen from FIG. 4 that the first data processing operation and the following data processing operation can be carried out in successive processing cycles ① and ②.

However, in the conventional bypass control, the register file 2 and the bypass circuit 3 are designed so as to conform to a large-scale computer designed to process data having a specific (fixed) word length. For this reason, the structure of FIG. 3 is not suitable for a small-scale computer where word length of data is not fixed but variable.

Figure 5:
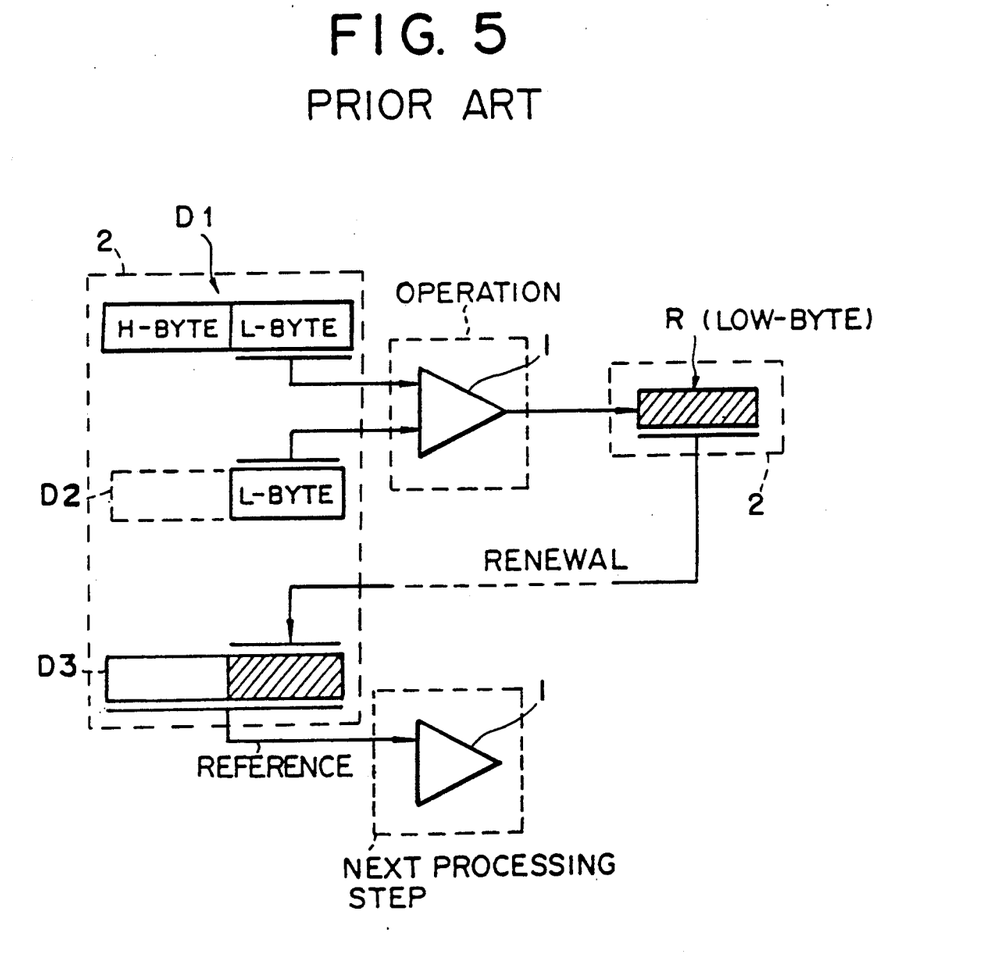
FIG. 5 is a view illustrating the problem presented in the data processing unit of FIG. 3.

FIG. 5 is a view illustrating the above-mentioned problem. It is assumed in FIG. 5 that a data processing is performed on low-order bytes of word length data D1 and D2 stored in the register file 2. The low-order byte of a word length data in the register file 2 is reversed with a resultant data R, and a revised word-length data D3 including the data R is used in the next data processing. In this case, only the data R is allowed to pass through the bypass circuit 3, while the high-order byte of the data D3 is still placed in the register file 2. Therefore, at this time, the processing block 1 cannot refer to the word length of data. For this reason, in practical use, after the renewal of the register file 2 ends, the word-length data having the revised low-order byte R in the register file 2 is read out therefrom and used in the next data processing step. The result is a loss of the advantages provided by the bypass control: a delay of data processing cannot be effectively overcome even when the bypass control is employed.

SUMMARY OF THE INVENTION

It is therefore a general object of the present invention to provide a data processing unit having a bypass circuit in which the above-mentioned disadvantages are eliminated.

A more specific object of the present invention is to provide a data processing unit having a bypass circuit which is capable of handling variable data length data with an increased data processing speed.

The above objects of the present invention can be achieved by a data processing unit having a bypass circuit which includes first and second buses and processing means for subjecting input data supplied from the first bus to a predetermined operation, thereby supplying the second bus with output data. Register file means are connected between the first and second buses for storing data on the second bus. The register file means include a plurality of register portions having a capacity equal to or exceeding a minimum data length of data processed in the processing means. Bypass means are connected between the first and second buses, for bypassing data on the second bus to output the data to the first bus per a unit of the minimum data length. The bypass means include a plurality of bypass lines each having the minimum data length. Finally, control means are provided for controlling data read from and data written to the register file means per a unit of the minimum data length and controlling the bypass means so as to bypass the data on the second bus to the first bus per a unit of the minimum data length.

Other objects, features and advantages of the present invention will become apparent from the following detailed description when read in conjunction with the accompanying drawings.

DESCRIPTION OF THE PREFERRED EMBODIMENTS

A description will now be given of a preferred embodiment of the present invention.

Figure 6:
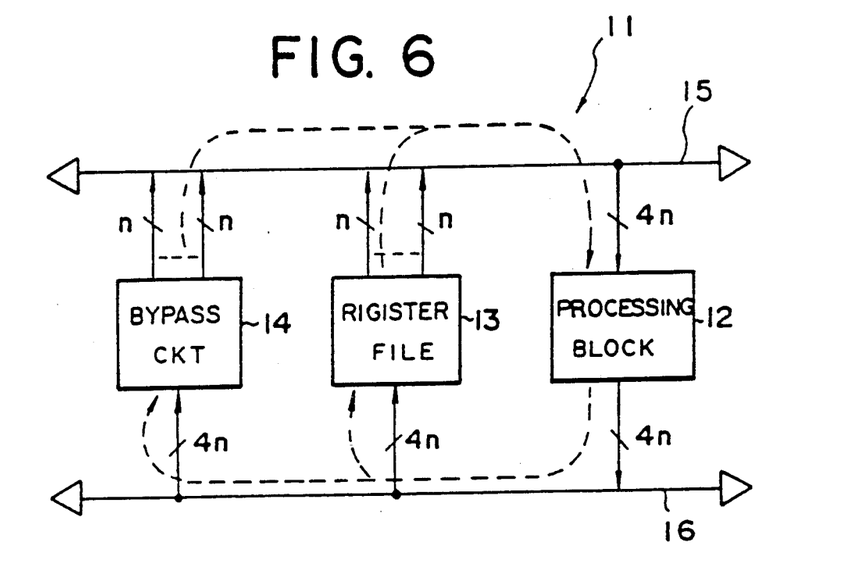
FIG. 6 is a block diagram of the basic structure of a preferred embodiment of the present invention.

FIG. 6 shows the basic structure of a data processing unit preferred embodiment of the present invention. The data processing unit 11 includes a processing block 12, a register file 13, and a bypass circuit 14, which are connected to a first bus 15 and a second bus 16. The number of lines included in each of the first and second buses 15 and 16 corresponds to a maximum word length which the processing block 12 can handle, 4n bits (n is an integer), for example.

The processing block 12 is an arithmetic and logic unit, for example, and carries out predetermined operations such as numerical operations and logical operation to data which are input therein through the first bus 15. The result of the predetermined operations is supplied to the second bus 16. The numerical operations executed in the process block 12 include addition, subtraction, multiplication, division and the like. The logical operation executed in the processing block 12 includes logical add, logical product and the like. The above-mentioned operations can be achieved by an adder for operating on a predetermined number of bits. That is, the word length of data to be processed depends on the number of bits which can be handled by the addition circuit (or arithmetic and logic circuit). For example, it is assumed that the processing block 12 is designed to process data having a data length of 1 byte (8 bits=n bits), 2 bytes (2n bits) or 4 bytes (4n bits). In this case, a data length of 1 byte is a minimum word length consisting of n bits, and an adder for operating on 1 byte would be employed. However, an adder for a half-byte (n/2 bits) may also be used. In this case, a half-byte would be the minimum word length.

The register file 13 includes a group of registers each capable of reading and writing data at a high speed. Each register in the register group consists of the number of bits (n), which corresponds to the minimum word length, and is coupled with the first bus 15 through n number of signal lines.

The bypass circuit 14 is connected to the second bus 16 on input terminals thereof, and is connected to the first bus 15 on output terminals thereof through four groups of signal lines, in which each group of signal lines consists of n number of signal lines. The bypass circuit 14 connects 4n signal lines of the second bus 16 to the first bus 15 per n number of signal lines.

Figure 7:
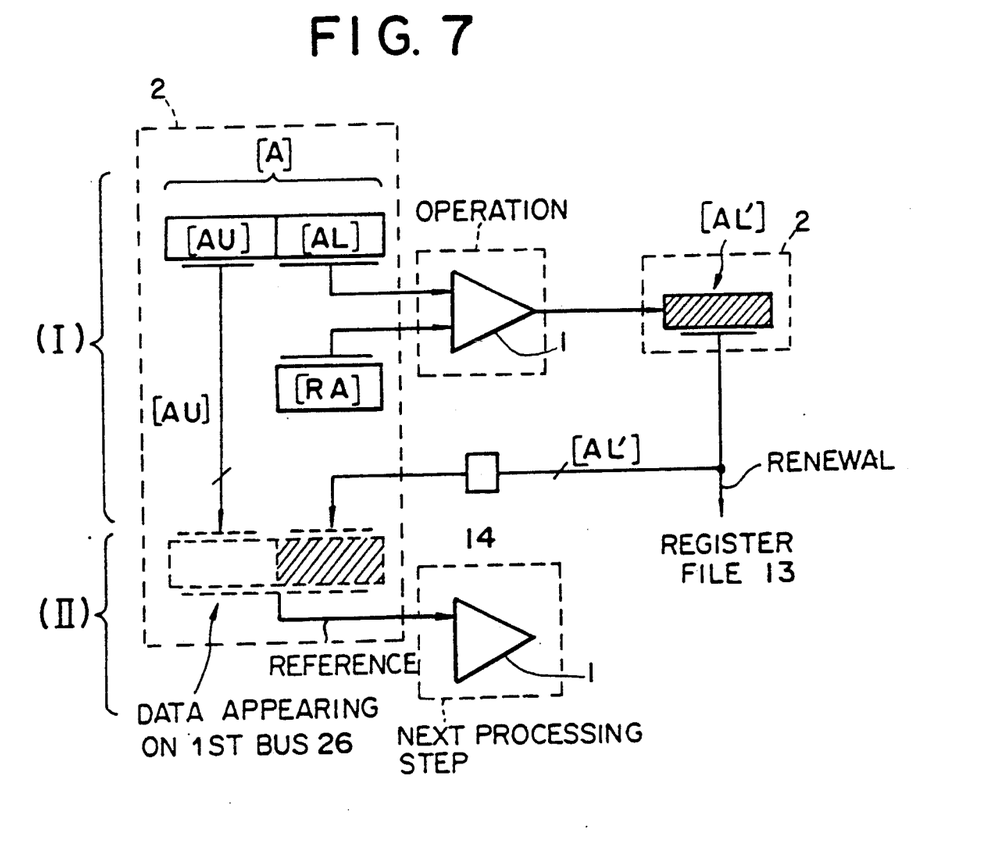
FIG. 7 is a view illustrating operation of the embodiment.

FIG. 7 is an illustration of the operation of the data processing unit 11.

The following are now assumed with reference to FIG. 7.

(I) A logical operation is carried out for two-byte length data [A] stored in the register file 13 and reference data [RA] of 1 byte. Then, the low-order byte data [AL] stored in the register file 13 is revised with an operation result [AL'].

(II) Next, high-order byte [AU] of the data [A] stored in the register file 13 and the operation result [AL'] are referred to, and a desired logical operation is carried out for two-byte length data of [AU]+[AL'].

It is noted that according to the conventional method, the above-described procedure (II) cannot be done until renewal of the register file 13 is, completed. On the other hand, according to the present invention, the processed low-order byte data [AL'] is sent to the first bus 15 through the bypass circuit, and at the same time, a register in the register group which stores the high-order byte [AU], is opened so that the byte data [AU] on the first bus 15 is output. Thereby, data consisting of bytes [AU]+[AL'] are available on the first bus 15. As a result, it becomes possible to execute the above-mentioned procedure (II) at the same time as the register file 13 is renewed, so that the delay of data processing can be prevented.

Figure 8:
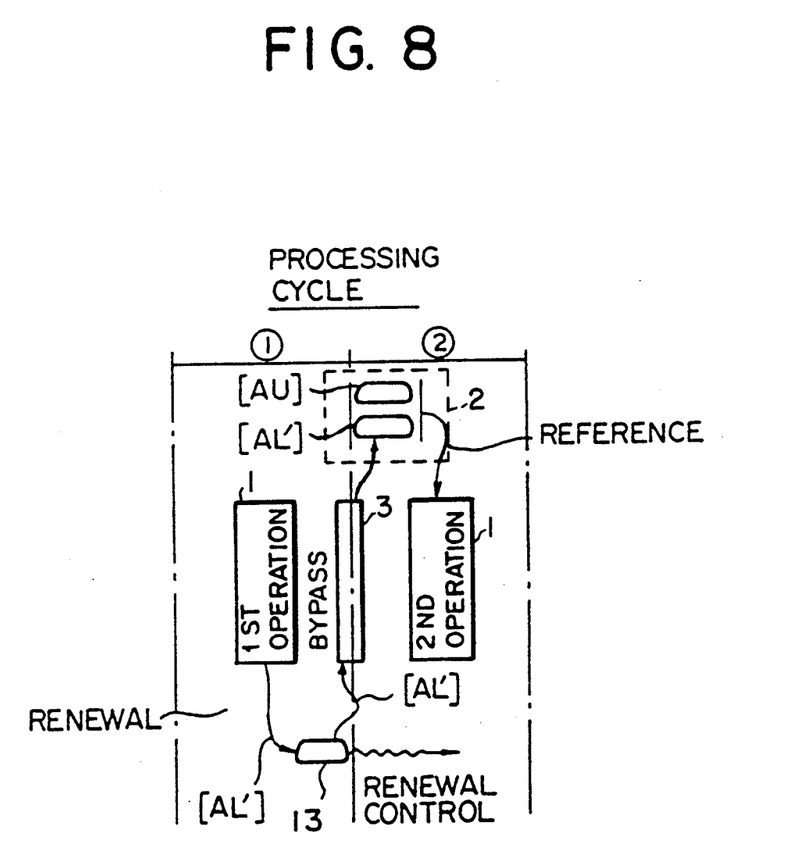
FIG. 8 is a timing chart illustrating the operation of the embodiment.

FIG. 8 is a view showing processing cycles of the above-mentioned data processing. In processing cycle ①, the register file 13 starts to be renewed with the processed low-order byte data [AL'], which is also bypassed through the bypass circuit 14. In processing cycle ②, subsequent to the processing cycle ①, the bypass low-order byte data [AL'] and the high-order byte data [AU] stored in the register file 13 become available on the first bus 15. As a result, the processing cycles ① and ② can be successively executed, so that no delay occurs.

Figure 9:
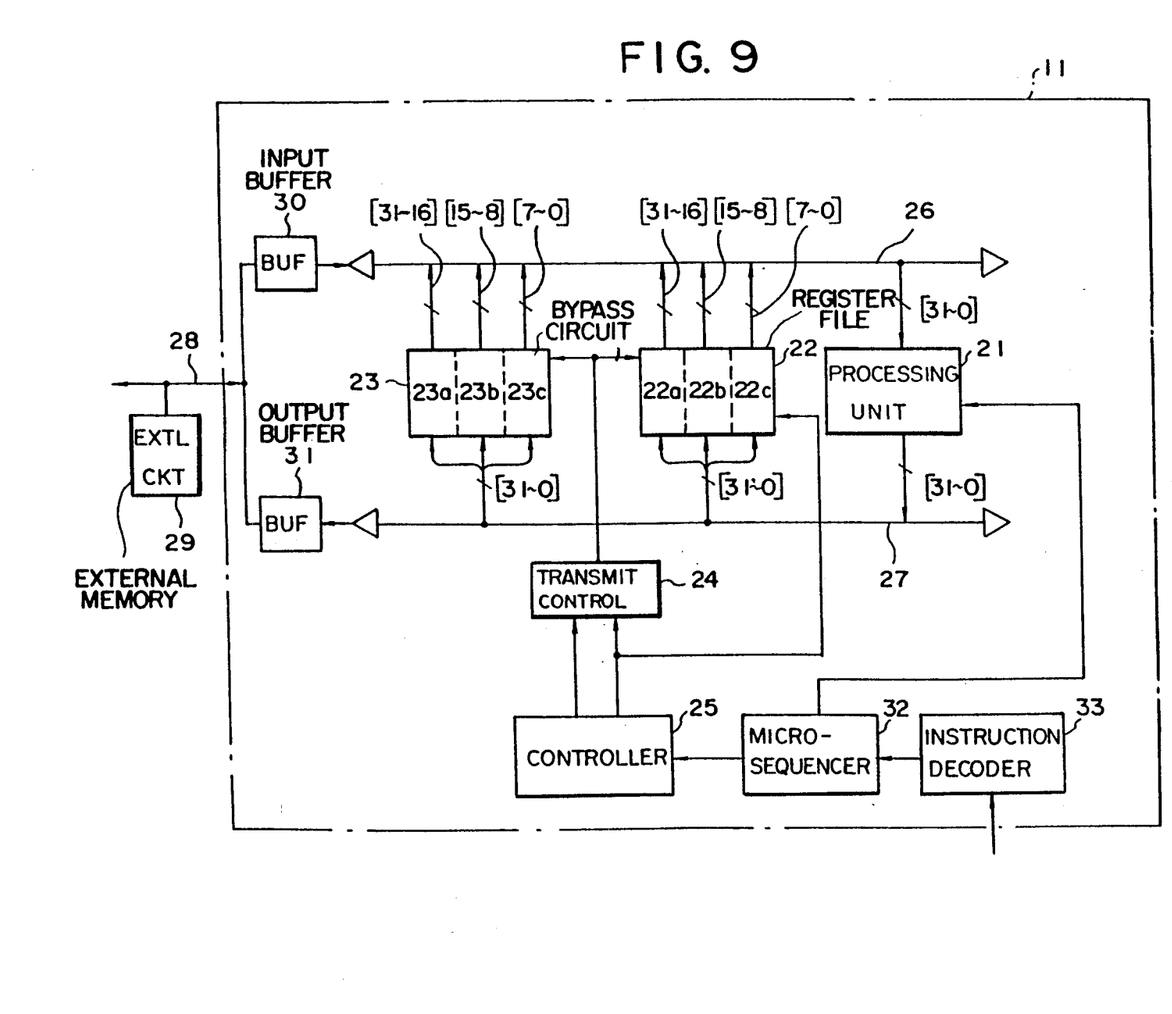
FIG. 9 is a block diagram illustrating the detailed structure of the embodiment.

FIG. 9 is a block diagram showing an example of the detailed structure for the data processing unit 11 in FIG. 6. A data processing unit 11 includes a processing block 21, a register file 22, a bypass circuit 23, a data transmit controlling circuit 24, a controller 25, first and second buses 26 and 27, an input buffer 30, an output buffer 31, a microsequencer 32 and an instruction decoder 33. The processing block 21 corresponds to the processing block 12 shown in FIG. 6, and, as necessary, subjects data (having a data length of byte 1 byte to 4 bytes) to a desired operation. The register file 22 corresponds to the register file 13 shown in FIG. 6, and is composed of three registers 22a, 22b and 22c. The bypass circuit 23 corresponds to the bypass circuit 14, and is made up of three bypass lines 23a, 23b and 23c. The data transmit controlling circuit 24 controls the register file 22 and the bypass circuit 23. The controller 25 controls the register file 22 and the data transmit controlling circuit 24. For this purpose, the controller 25 generates various control information, which will be described later. Each of the first and second buses 26 and 27 includes 32 signal lines which correspond to 4 bytes and are numbered as [31-0]. The input buffer 30 is interposed between the first bus 26 and an external bus 28, to which an external memory 29 is coupled, for example. The input buffer 30 inputs data supplied from an external circuit such as the external memory 29 through the external bus 28, and sends the same on the first bus 26.

The output buffer 31 is interposed between the external bus 28 and the second bus 27, and sends data on the second bus 27 to the external circuit such as the external memory 29. The instruction decoder 33 decodes an instruction supplied from an external circuit such as a central processing unit (not shown). The microsequencer 32 controls the controller 25 and the processing block 21 such as an arithmetic and logic circuit in accordance with the decoded instruction supplied from the instruction decoder 33.

The first and second buses 26 and 27 are connected to the processing block 21, the register file 22 and the bypass circuit 33. The processing block 21 is connected to the first and second buses 26 and 27 through signal lines [31-0] provided on input and output terminals thereof. The first and second buses 26 and 27, and the register file 22 are mutually connected as follows. The registers 22c, 22b and 22a are respectively provided with bits [31-16], [15-8] and [7-0] of data on the second bus 27. The outputs of the registers 22a, 22b and 22c are connected to the first bus 26 through signal lines which transmit bits [31-16], [15-8] and [7-0], respectively. In the same manner, the bypass circuit 23 which consists of three bypass lines 23a, 23b and 23c, is connected to the first and second buses 26 and 27.

Table 1 shows data to be sent through the bypass circuit 23 to the first bus 26, based on combinations of the renewal size for the register file 22 and a size of data to be processed in the next data processing step (defined as a reference size) which corresponds to procedure (II) shown in FIG. 7. Table 2 shows data read out from the register file 22 to the fist bus 26, based on combinations of the renewal size for the register file 22 and the reference size. In Tables 1 and 2, a mark 'o' indicates data to be sent on the first bus 26.

TABLE 1

| | | Bit number of data supplied from bypass circuit 23 | | |
|---|---|---|---|---|
| Renewal size | Ref size | [31-16] | [15-8] | [7-0] |
| Byte | Byte | | | o |
| | Half-word | | | o |
| | Word | | | o |
| Half-Word | Byte | | | o |
| | Half-word | | o | o |
| | Word | | o | o |
| Word | Byte | | | o |
| | Half-word | | o | o |
| | Word | o | o | o |

TABLE 2

| | | Bit number of data supplied from register file 22 | | |
|---|---|---|---|---|
| Renewal size | Ref size | [31-16] | [15-8] | [7-0] |
| Byte | Byte | | | |
| | Half-word | | o | |
| | Word | o | o | |
| Half-Word | Byte | | | |
| | Half-word | | | |
| | Word | o | | |
| Word | Byte | | | |
| | Half-word | | | |
| | Word | | | |

It can be seen from Tables 1 and 2 that even when the combiation of the renewal size and the reference size relates to any data size such as a word, a half-word or a bye, the necessary data is available on the first bus 26, so that the necessary data can be supplied to the processing block 21. It follows that the present invention can handle variable length data with high flexibility, which results in an increased data processing speed.

Figure 10:
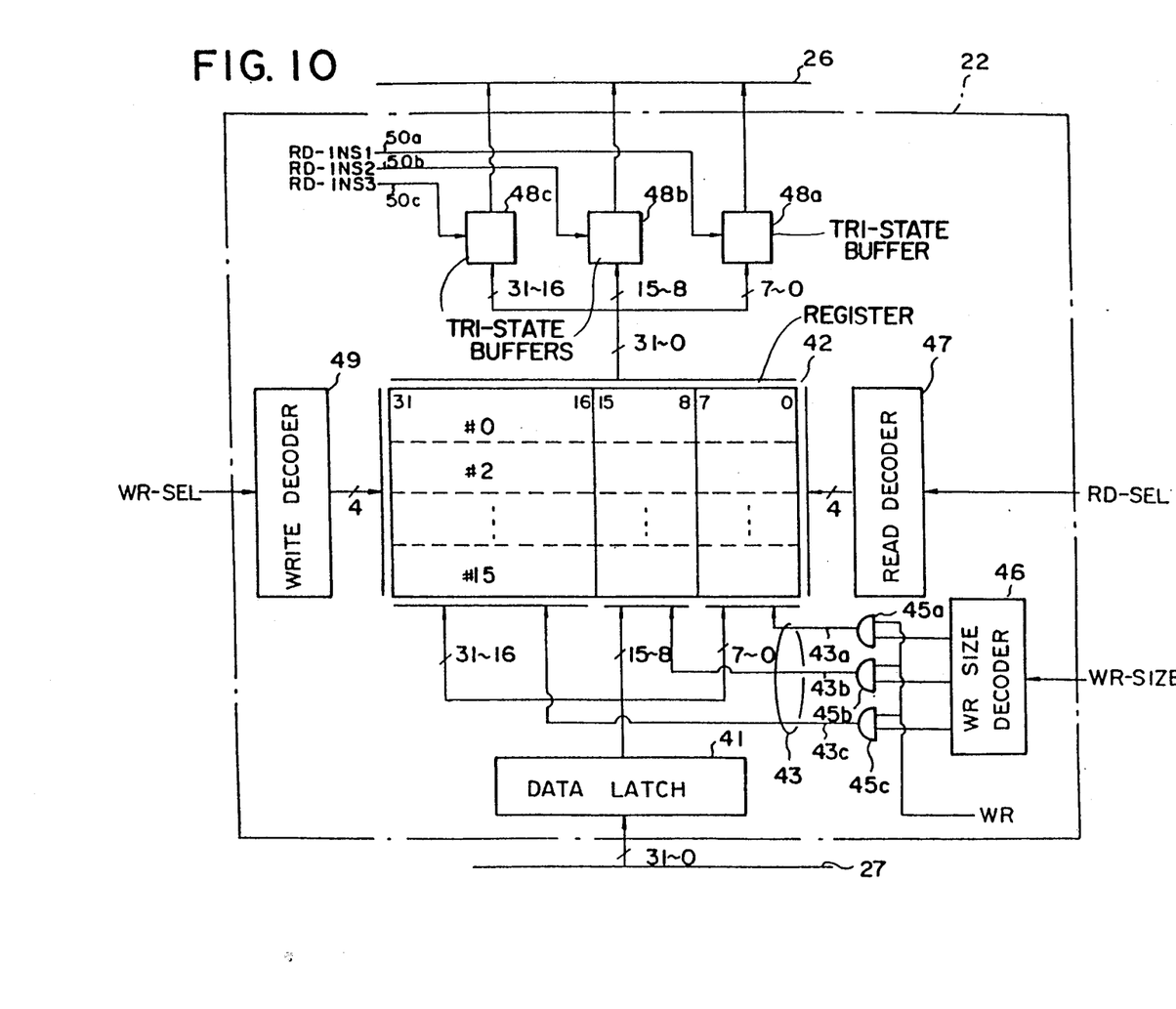
FIG. 10 is a block diagram of an example of a register file used in the structure of FIG. 9.

A description is given of the detailed structure of the register file 22 shown in FIG. 9 by referring to FIG. 10. A data latch circuit 41 temporarily stores data consisting of bits numbered as [31-0] supplied from the second data bus 27. A register 42 consists of 16 registers #0-#15, each of which consists of 32 bits.

Figure 11:
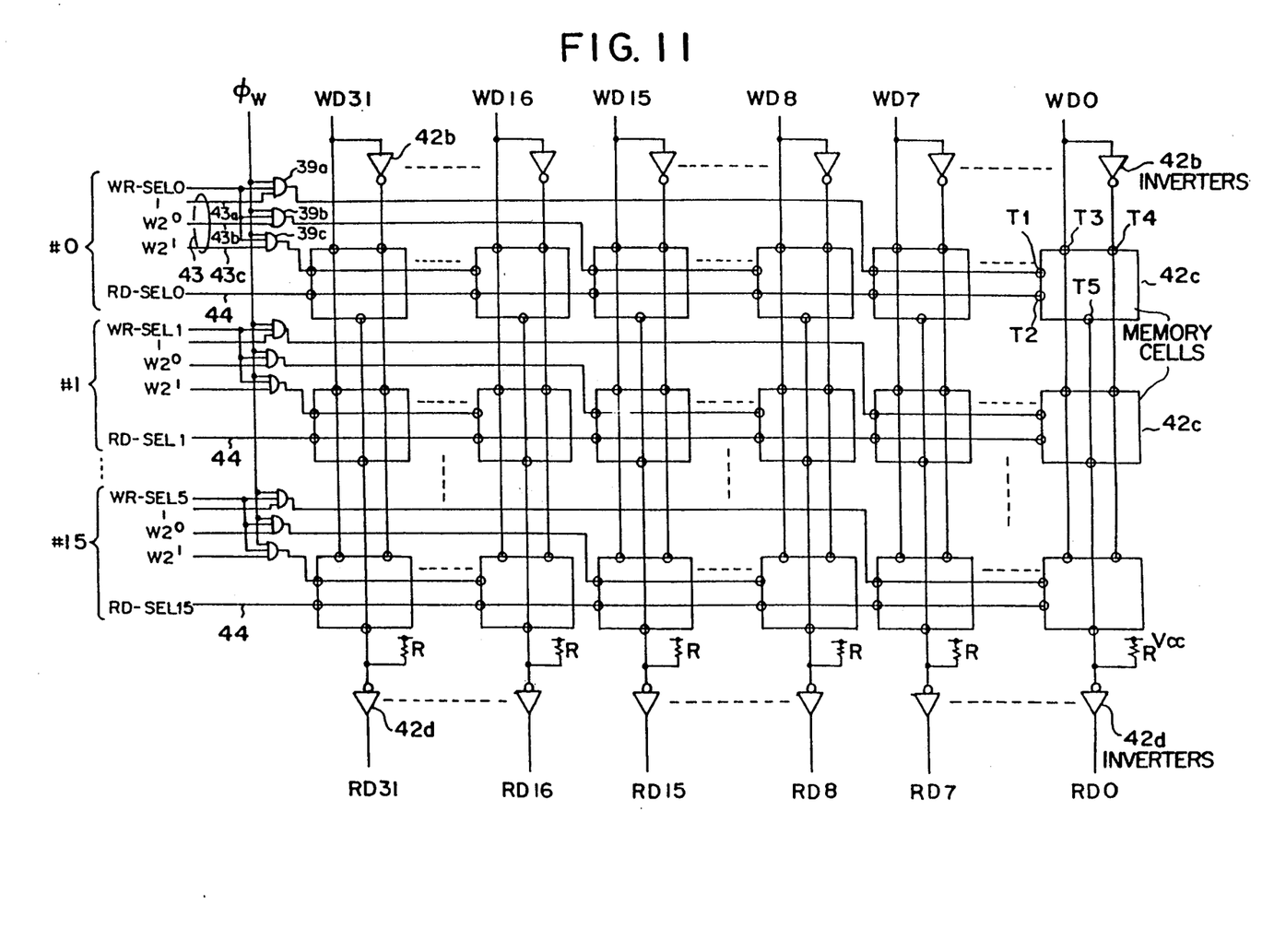
FIG. 11 is a circuit diagram of registers used in the structure of FIG. 10.

FIG. 11 is a circuit diagram of the register 42. Referring to FIG. 11, WD31-WD0 indicate write word lines, and RD31-RD0 indicate read data lines. Each of the word data lines WD31-WD0 is connected to a terminal T3 of corresponding memory cells 42c arranged in each of the registers #0-#15. The word data lines WD31-WD0 are also connected to corresponding inverters 42b, which are connected to terminals T4 of the corresponding memory cells 42c provided in each of the registers #0-#15. The read data line RD15-RD0 are connected to terminals T5 of corresponding memory cells 42c provided in each of the registers #0-#15. The read data line RD31-RD0 are connected to corresponding inverters 42d, and are pulled up to a positive potential Vcc through corresponding registers R connected at input terminals of the inverters 42d.

A write word line 43 is provided for each of the registers #0-#15. The write word line 43 consists of first, second and third write word lines 43a, 43b and 43c, respectively. The first, second and third write word lines 43a, 43b and 43c are connected to AND gates 39a, 39b and 39c, respectively. The AND gates 39a, 39b and 39c relating to the registers #1, #2, ..., #15 are provided with decoded write selection codes WR-SEL0, WR-SEL1, ..., WR-SEL15, respectively, which are derived from a write decoder 49 (FIG. 10) by decoding a write selection code WR-SEL supplied from the controller 25. The AND gates 39a, 39b and 39c are also supplied with a write timing signal $\phi_W$ supplied from the controller 25 (FIG. 9). An output terminal of the AND gate 39a provided for each register is connected to terminals T1 of the memory cells 42c connected to the write data lines WD7-WD0. An output terminal of the AND gate 39b provided for each register is connected to terminals T1 of the memory cells 42c connected to the write data lines WD15-WD8. An output terminal of the AND gate 39c provided for each register is connected to terminals T1 of the memory cells 42c connected to the write data lines WD31-WD16. The first, second and third word lines 43a, 43b and 43c are connected to output terminals of AND gates 45a, 45b and 45c shown in FIG. 10, respectively. As input terminal of each AND gate 45a, 45b and 45c is supplied to a write enable signal WR, and the other input terminal thereof is connected to a write size decoder 46.

A write size code RW-SIZE is derived from the controller 25 shown in FIG. 9, and is supplied to the write size decoder 46. The write size decoder 46 decodes the write size code WR-SIZE, and generates a write word code which consists of three bits. A binary value "1" is always output on the first write word line 43a. Bits $W2^0$ and $W2^1$ are output on the second and third write word lines 43b and 43c, respectively. A read word line 44 provided for each of the registers #0-#15 is connected to terminals T2 of all the memory cells 42c. Decoded read selection codes RD-SEL0, RD-SEL1, ..., RD-SEL15 derived from a read decoder 47 (FIG. 10) are transferred on the corresponding read word lines 44. The read decoder 47 is supplied with a read selection code RD-SEL, which is supplied from the controller 25 shown in FIG. 9.

Figure 12:
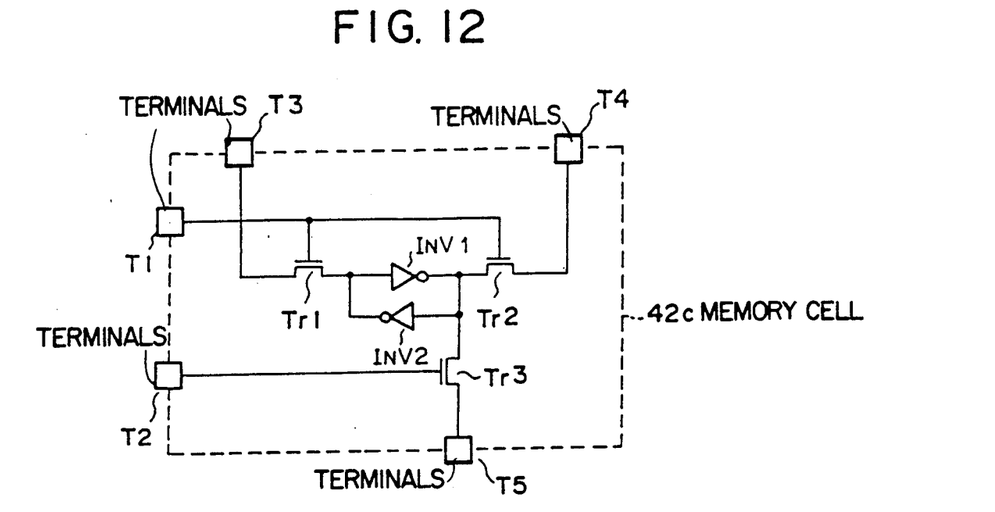
FIG. 12 is a circuit diagram of an example of a memory cells provided in the register file shown in FIG. 11.

FIG. 12 is a circuit diagram of each memory cell 42c. The memory cell 42c includes three metal oxide semiconductors (hereafter simply referred to as MOS) transistors Tr1, Tr2 and Tr3, and inverters INV1 and INV2, which are connected as shown in FIG. 12.

The read data lines RD7-RD0 are connected to a tris-state buffer 48a, and the read data lines RD15-RD8 are connected to a tri-state buffer 48b. The read data lines RD31-RD16 are connected to a tri-state buffer 48c. The tri-state buffers 48a, 48b and 48c are supplied, through control lines 50a, 50b and 50c, with read instruction signals RD-INS1, RD-INS2 and RD-INS3, respectively. As will be described in detail later, the read instruction signals RD-INS1, RD-INS2 and RD-INS3 are generated by the data transmist controlling circuit 24.

Figure 13:
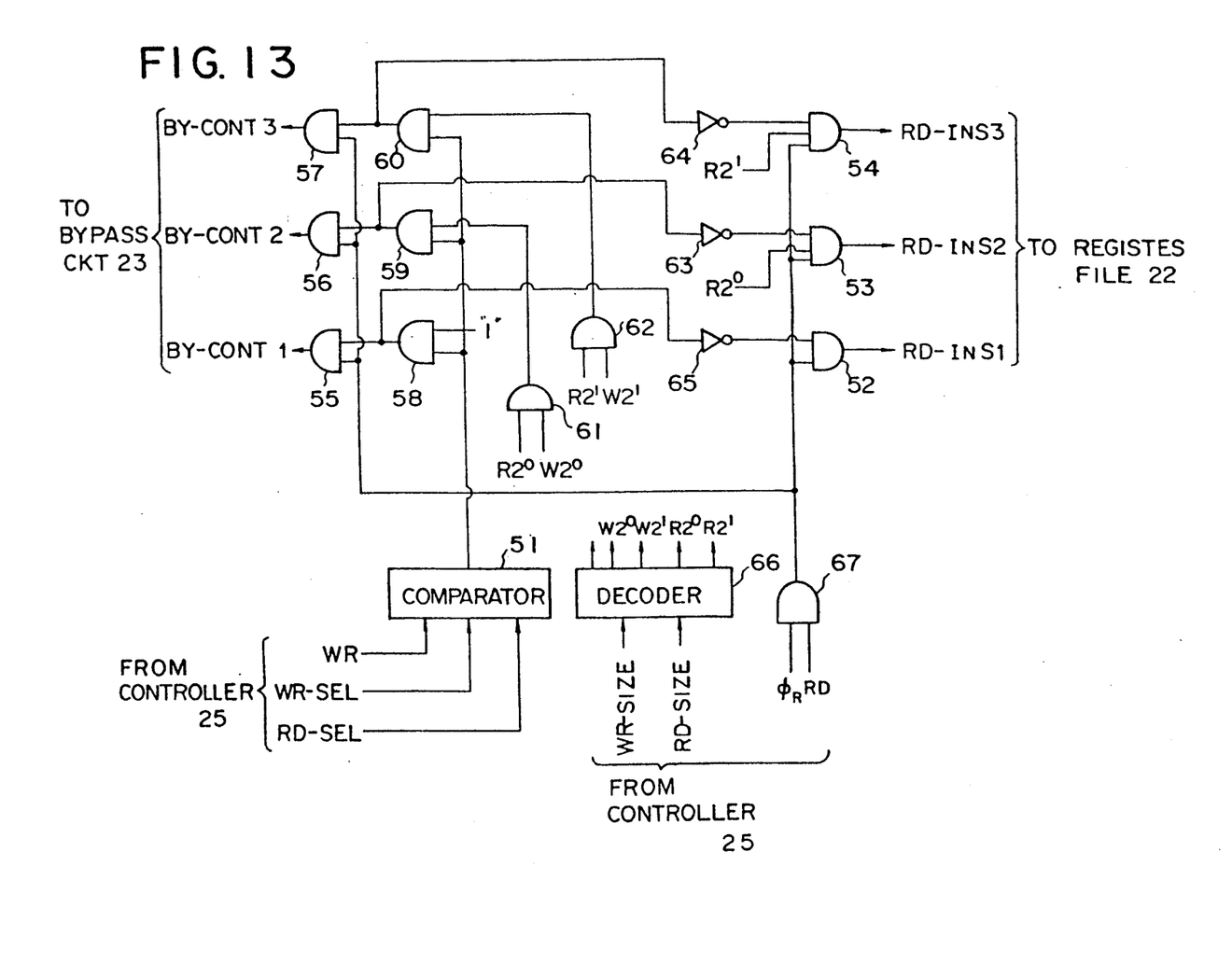
FIG. 13 is a circuit diagram of an example of a data transmit controlling circuit used in the structure of FIG. 9.

FIG. 13 is a circuit diagram of the data transmit controlling circuit 24. A read signal RD derived from the controller 25 is supplied to an AND gate 67, which is also supplied with a read timing signal $\phi_R$ generated by the controller 25. An output of the AND gate 67 is connected to AND gates 52 through 57. A comparator 51 compares the content of the read selection code RD-SEL with the content of the write selection code WR-SEL, when the write enable signal WR is supplied from the controller 25. As described previously, the read and write selection codes RD-SEL and WR-SEL are also supplied from the controller 25. When the content of the read selection code RD-SEL coincides with the content of the write selection code WR-SEL, the comparator 51 outputs a binary value of "1" (high level). The output signal of the comparator 51 is fed to AND gates 58, 59 and 60. AND gates 61 and 62 are supplied with bits $W2^0$ and $W2^1$ of the decoded write size code, respectively, which is generated, by a decoder 66, from the write size code WR-SIZE supplied from the controller 25. The bits $W2^0$ and $W2^1$ are identical to those to be supplied to the AND gates 39b and 39c shown in FIG. 11. The AND gates 61 and 62 are also supplied with bits $R2^0$ and $R2^1$ of a decoded read size code, respectively, which is generated, by the decoder 66, from a read size code RD-SIZE supplied from the controller 25. The AND gate 58 is always supplied with a binary value of "1" from the decoder 66. As described previously, the present embodiment can process data of the size of a byte, a half-word or a word.

Table 3 shows the relationship between the write size and values of the write size code WR-SIZE.

TABLE 3

| Write size | $W2^0$ | $W2^1$ |
|---|---|---|
| Byte | 0 | 0 |
| Half-word | 0 | 1 |
| Word | 1 | 1 |

Table 4 shows the relationship between the read size and values of the read size code RD-SIZE.

TABLE 4

| Read size | $R2^0$ | $R2^1$ |
|---|---|---|
| Byte | 0 | 0 |
| Half-word | 0 | 1 |
| Word | 1 | 1 |

Output signals of the AND gates 61 and 62 are supplied to the AND gates 59 and 60, respectively. The output terminal of the AND gate 58 is connected directly to the AND gate 55, and also the AND gate 52 through an inverter 65. The output terminals of the AND gates 59 and 60 are connected to inverters 63 and 64, and also the AND gates 56 and 57, respectively. The output terminals of the inverters 63 and 64 are connected to the AND gates 53 and 54. The AND gates 53 and 54 are supplied with bits $R2^0$ and $R2^1$ of the read selection code RD-SEL. Output signals of the AND gates 52, 53 and 54 are supplied, as read instruction signals RD-INS1, RD-INS2 and RD-INS3, to the tri-state buffers 48a, 48b and 48c through the control lines 50a, 50b and 50c, respectively. Output signals of the AND gates 55, 56 and 57 are control signals BY-CONT1, BY-CONT2 and BY-CONT3, respectively, and are supplied to the bypass circuit 23.

Figure 14:
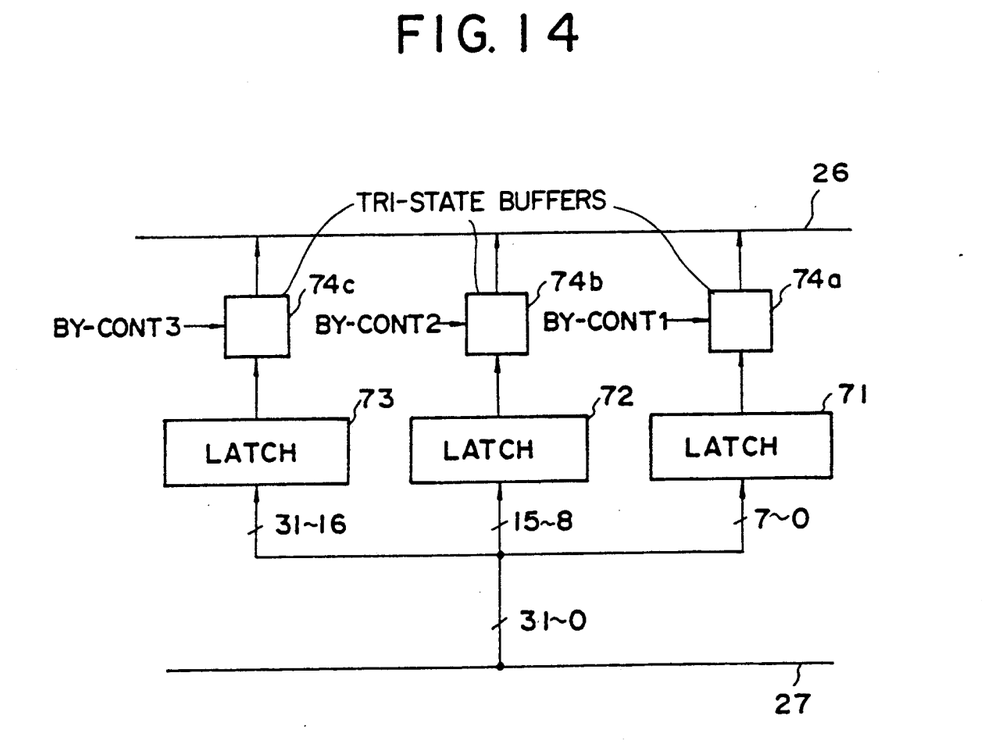
FIG. 14 is a block diagram of an example of a bypass circuit used in the structure of FIG. 9.

FIG. 14 is a block diagram of the bypass circuit 23. The bypass circuit comprises latch circuits 71, 72 and 73, and tri-state buffers 74a, 74b and 74c. The latch circuits 71, 72 and 73 are supplied with data bits [7-0], [15-8] and [31-16], respectively. The tri-state buffers 74a, 74b and 74c are connected to the latch circuits 71, 72, and 73, respectively, and are controlled by the control signals BY-CONT1, BY-CONT2 and BY-CONT3, respectively.

Figure 15:
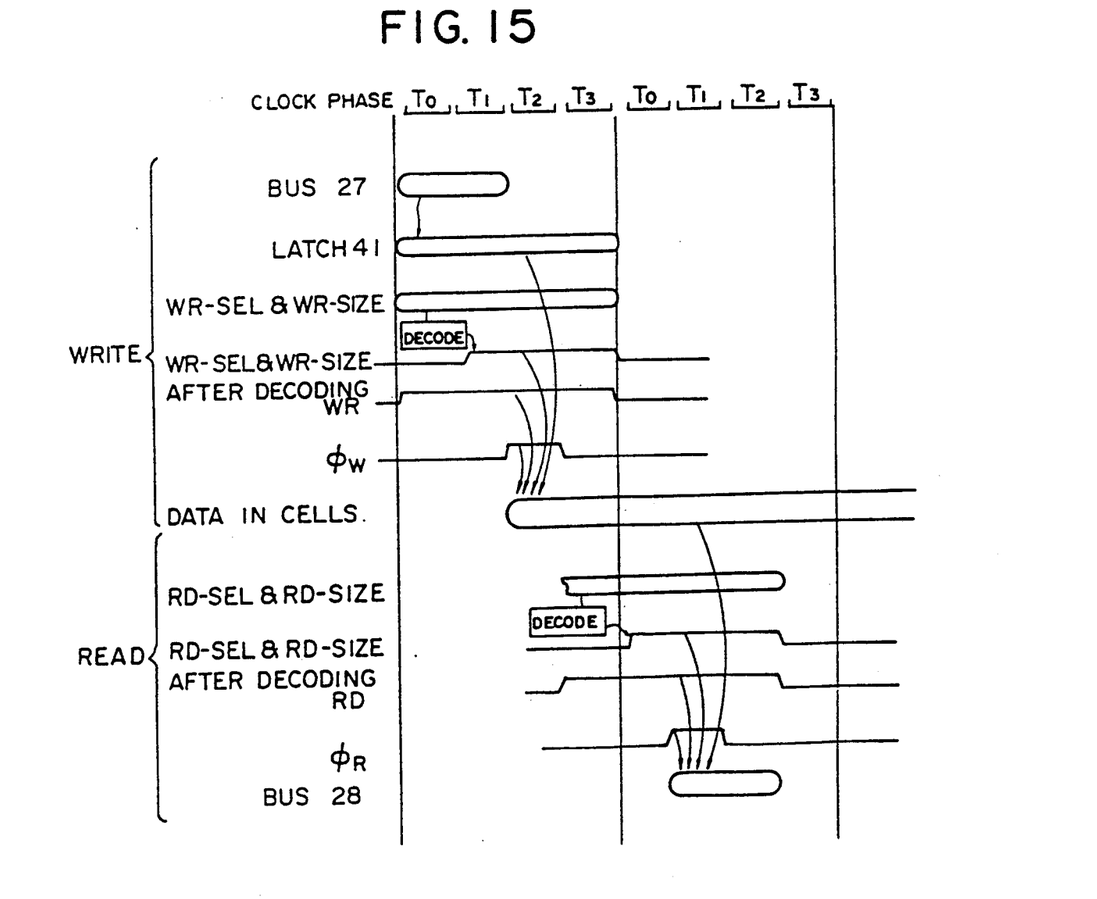
FIG. 15 is a timing chart showing read/write operation with respect to the register file shown in FIG. 10.

A description is given of read/write operation with respect to the register 42 when no bypass operation is performed, with reference to FIG. 15. At the commencement of write operation, data on the second bus 27 is input in the data latch circuit 41. At this time, the write enable signal WR is kept at the high level, the write selection code WR-SEL and the write size code WR-SIZE are supplied to the write decoder 49 and the write size decoder 46, respectively. The write size code WR-SIZE is decoded by the write size decoder 46, and in a clock phase T2, the decoded write size code consisting of bits 1, $W2^0$, $W2^1$ is supplied to the register 42 through the AND gates 45a, 45b and 45c. In the clock phase T2, the decoded write selection codes WR-SEL0 to WR-SEL15 are supplied to the registers #0 to #15, respectively. Thereafter, in a clock phase T2, the write clock $\phi_W$ is switched to the high level, and thereby the data latched in the data latch circuit 41 is written into memory cells 42c of the register which is designated by the decoded write selection code and the decoded write size code.

In a clock phase T3, the read selection code RD-SEL is supplied to the read decoder 47 (FIG. 10), and the read size signal RD-SIZE is supplied to the read size decoder 66 (FIG. 13). The read instruction signals RD-INS1 to RD-INS3, and the control signals BY-CONT1 to BY-CONT3 has corresponding levels based on the combination of the decoded write size code and the decoded read size code. When there exists no requirement for the bypass operation, the write selection code WR-SEL and the read selection code RD-SEL do not coincide with each other. Therefore, the comparator 51 outputs no signal, or in other words, is kept at a low level. As a result, the AND gates 58, 59 and 60 are kept in the closed state, so that the control signal BY-CONT1 to BY-CONT3 are kept at the low level, and thereby the tri-state buffers 48a, 48b and 48c (FIG. 10) are kept closed. Then in a clock phase T2 in the second cycle, a read timing signal $\phi_R$ is switched to the high level, and thereby the data designated by the read size code RD-SIZE and the read selection code RD-SEL is read out and output to the first bus 26.

Figure 16:
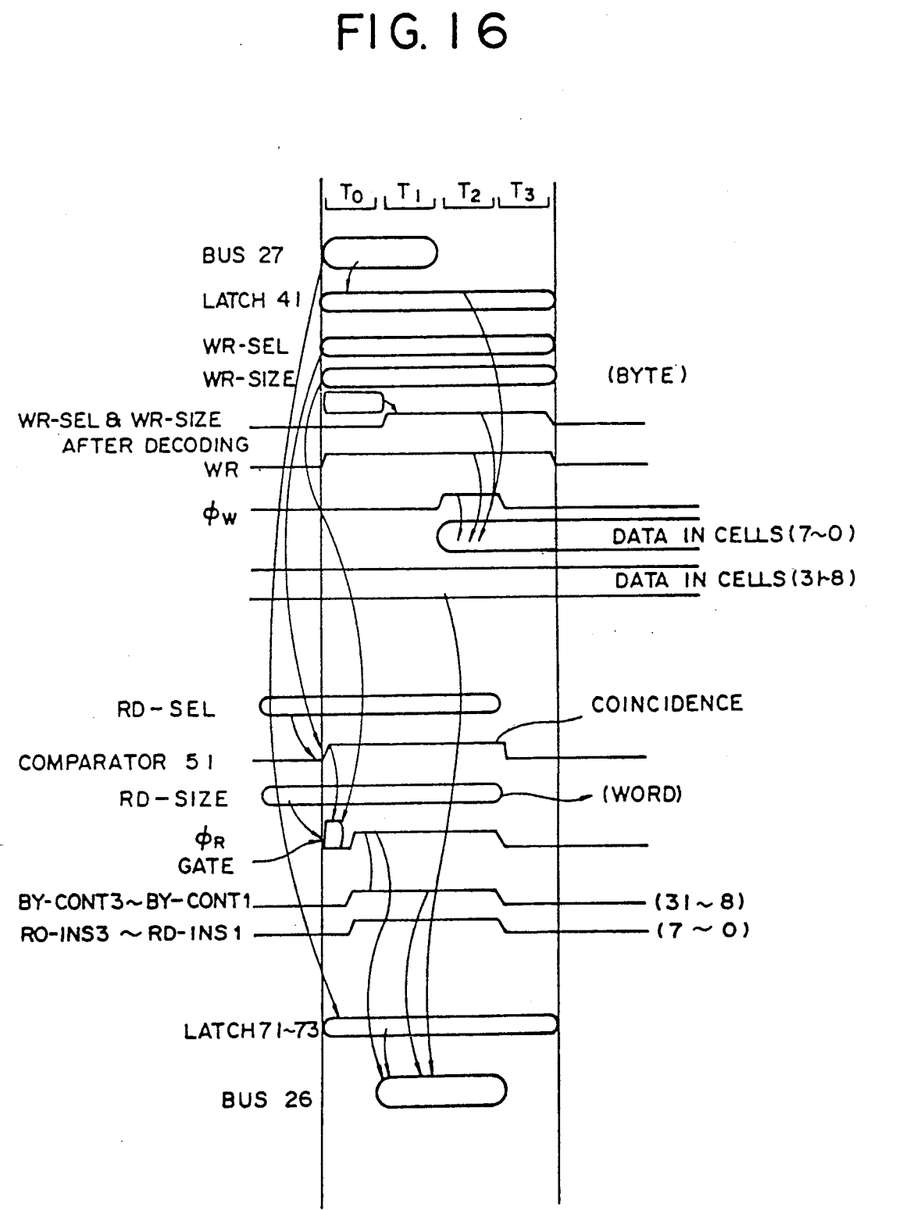
FIG. 16 is a timing chart showing operation of the embodiment when the bypass operation is required.

A description is given of the bypass operation with reference to FIG. 16. The data on the second bus 27 is latched in the data latch circuit 41. The write selection code WR-SEL and the write size code WR-SIZE are supplied to the write decoder 49 and the write size decoder 46 (FIG. 10), respectively. It is now assumed that the write size code WR-SIZE represents "byte". In clock phase T2, the write timing signal $\phi_W$ is switched to the high level, and thereby bits [7–0] of the latched data are written to the corresponding register in the register file 47.

On the other hand, the controller 25 is already outputting the read selection code RD-SEL and the read size code RD-SIZE. It is now assumed that the read size code RD-SIZE indicates "word". The write selection code WR-SEL and the read selection code RD-SEL are supplied to the comparator 51 (FIG. 13), which compares them with each other when the write enable signal WR is supplied thereto. When the bypass operation is required, the write selection code WR-SEL and the read selection code RD-SEL coincide with each other. Therefore, the comparator 51 produces the comparison result of the high level, which is supplied to the AND gates 58–60 (FIG. 13). Bits $W2^0$ and $W2^1$ of the decoded write size code WR-SIZE derived from the decoder 66 are supplied to the AND gates 61 and 62 (FIG. 13), respectively. At this time, the write size code WR-SIZE supplied to the decoder 66 is the same as the write size code WR-SIZE supplied to the write size decoder 46 (FIG. 10). Bits $R2^0$ and $R^1$ of the decoded read size code RD-SIZE derived from the decoder 66 are supplied to the AND gates 61 and 62, respectively. In the present example, the designated write size is "byte". Therefore, both the bits $W2^0$ and $W2^1$ are 0. As a result, the control signal BY-CONT1 is 1, and the control signals BY-CONT2 and BY-CONT2 are 0. On the other hand, the designated read size is "word". Therefore, both the bits $R2^0$ and $R^1$ are 1. As a result, the read instruction signal RD-INS1 is 0 and the read instruction signals RD-INS2 and RD-INS2 are 1. During the one cycle of the bypass operation, the read signal RD (not shown in FIG. 16) is kept at the high level, and the read timing signal $\phi_R$ is switched to the high level at the start of the clock phase 2. Therefore, the AND gates 52 to 57 (FIG. 13) are made open. As a result, only the tri-state buffer 74a (FIG. 14) is made open and is allowed to pass through bits [7–0] latched in the latch circuit 71, and on the other hand, the tri-state buffers 48b and 48c (FIG. 10) are opened, and are allowed to pass through bits [31–8] output from the register 42.

In the alternative, it is possible to provide the controller 25 with the comparator 51 and the decoder 66 without providing the data transmit controlling circuit 24 with those parts.

The present invention is not limited to the embodiments, and variations and modification may be made without departing from the scope of the present invention.

What is claimed is:

1. A data processing unit, comprising:
    first and second buses;
    processing means for subjecting input data supplied from said first bus to a predetermined operation and sending output data resulting from said predetermined operation to said second bus;
    register file means, connected between said first and second buses, for storing data to be sent on said second bus, said register file means including register portions having a capacity equal to or exceeding a minimum data length processed in said processing means;
    bypass means, connected between said first and second buses, for bypassing units of said minimum data length of said data to be sent on said second bus to output said data to said first bus, said bypass means including bypass lines each having said minimum data length; and
    control means for controlling an amount of the units of said minimum data length of said data read from and written to said register file means and controlling said bypass means so as to bypass the units of said minimum data length of said data to be sent on said second bus to said first bus.

2. A data processing unit as claimed in claim 1, wherein said control means comprises first control means for designating at least one of said register portions in which said data to be sent on said second bus is to be written, and second control means for designating at least one of said register portions from which said data is to be read out and to be supplied to said first bus and for designating at least one of said bypass lines through which said data to be sent on said second bus is sent to said first bus.

3. A data processing unit as claimed in claim 1, wherein said first control means designates said register portions in which said data to be sent on said second bus is to be written, on the basis of a write size which indicates a data length of said data to be written into said register file means.

4. A data processing unit as claimed in claim 1, wherein said second control means designates register portions from which said data is read out, on the basis of a read size which indicates a data length of data to be read out from said register file means.

5. A data processing unit as claimed in claim 1, wherein said second control means designates bypass portions through which said data to be sent on said second bus is sent to said first bus, on the basis of a write size which indicates a data length of data to be written into said register file means and a read size which indicates a data length of data to be read out from said register file means.

6. A data processing unit as claimed in claim 1, wherein said register file means comprises data latch means for latching said data to be sent on said second bus, a plurality of registers for storing data supplied from said latch means, and selector means for selecting data which is to be read out from one of said plurality of registers and is to be sent to said first bus.

7. A data processing unit as claimed in claim 1, wherein when the data is written to read from a same register portion among the register portions in said register file means, said bypass means bypasses said data on said second bus to said first bus.

8. A data processing unit as claimed in claim 1, wherein when said processing means is capable of handling data of 1 byte to 4 bytes, said register file means includes three register portions, and each of two of said register portions consists of 8 bits, and the remaining register portion consists of 16 bits.

9. A data processing unit as claimed in claim 1, wherein said bypass means comprises a plurality of latch means for latching said data on said second bus, and selector means for selecting at least one of said latch means to connect the selected register to said first bus.

10. A data processing unit as claimed in claim 1, wherein when said processing means is capable of handling data of 1 byte to 4 bytes, said bypass means includes three register portions, and each of two of said register portions consists of 8 bits, and the remaining register portion consists of 16 bits.

11. A data processing unit as claimed in claim 1, wherein said processing means comprises an arithmetic and logic unit.

12. A data processing unit as claimed in claim 1, further comprising instruction decoder means for decoding an instruction code supplied from an external circuit, and microsequencer means for controlling said control means based on a decoded instruction code supplied from said instruction decoder means.

13. A data processing unit as claimed in claim 1, further comprising input buffer means for sending said first bus data supplied from an external circuit, and output buffer means for sending said external circuit data on said second bus.

14. A microprocessor, comprising:
a first bus;
a second bus;
a register circuit coupled to said first and second buses and storing a plurality of bits;
a variable bit length bypass circuit including a plurality of bypass paths connected to said first and second buses; and
a data processing unit coupled to said first and second buses and selectively activating said bypass paths when some of said plurality of bits stored in said register circuit are replaced, supplying data on said second bus corresponding to said some of the bits to be replaced to said first bus via at least one selectively activated bypass path, and outputting remaining bits stored in said register circuit and other than said some of the bits to be replaced to said first bus from said register circuit.

* * * * *

UNITED STATES PATENT AND TRADEMARK OFFICE
CERTIFICATE OF CORRECTION

PATENT NO.   : 5,101,489
DATED        : March 31, 1989
INVENTOR(S)  : Sato et al It is certified that error appears in the above-identified patent and that said Letters Patent is hereby corrected as shown below:

On the Title page, In the Abstract:

Line 13, change "writing" to --written--.

Column 4, line 50, delete "byte", first occurrence.
Column 6, line 34, change "WR-SELL" to --WR-SEL1--.
        line 51, change "As" to --An--.

Signed and Sealed this

Twentieth Day of July, 1993

Attest:

MICHAEL K. KIRK

*Attesting Officer*   Acting Commissioner of Patents and Trademarks